United States Patent [19]

Ueno

[11] 4,377,216

[45] Mar. 22, 1983

[54] VIBRATION DAMPING BUSHING

[75] Inventor: Kenzo Ueno, Sayama, Japan

[73] Assignee: Nissan Motor Co., Ltd., Yokohama, Japan

[21] Appl. No.: 206,109

[22] Filed: Nov. 12, 1980

[30] Foreign Application Priority Data

Nov. 15, 1979 [JP] Japan .................. 54-148162

[51] Int. Cl.³ ............................................ B60B 35/12
[52] U.S. Cl. ........................... 180/73 TL; 248/562; 267/63 R
[58] Field of Search ............ 180/73 R, 73 TL, 312; 248/562; 267/57.1 R, 63 R, 140.1; 280/666; 267/63 A

[56] References Cited

U.S. PATENT DOCUMENTS

| | | | |
|---|---|---|---|
| 2,614,896 | 10/1952 | Pierce | 308/26 |
| 2,989,330 | 6/1961 | Wroby | 287/85 |
| 3,083,032 | 3/1963 | Cuskie | 280/666 |
| 3,147,964 | 9/1964 | Wolf | 267/63 R |
| 3,403,899 | 10/1968 | Plume | 267/35 |
| 3,698,703 | 10/1972 | Hipsher | 267/63 R |
| 4,121,813 | 10/1978 | Inuzuka | 267/63 A |

FOREIGN PATENT DOCUMENTS

| | | |
|---|---|---|
| 9120 | 4/1980 | European Pat. Off. . |
| 2523916 | 12/1976 | Fed. Rep. of Germany .... 180/73 R |
| 1439054 | 4/1966 | France . |
| 1590701 | 5/1970 | France . |
| 2017031 | 5/1970 | France . |
| 2225507 | 7/1975 | |
| 2394715 | 1/1979 | France . |
| 610959 | 10/1948 | United Kingdom . |
| 1098788 | 1/1968 | United Kingdom . |
| 1242965 | 8/1971 | United Kingdom . |
| 1433772 | 4/1976 | United Kingdom . |

Primary Examiner—Joseph F. Peters, Jr.
Assistant Examiner—Ross Weaver
Attorney, Agent, or Firm—Thompson, Birch, Gauthier & Samuels

[57] ABSTRACT

A vibration damping bushing having an energy absorbing sleeve positioned about an inner sleeve and within an outer sleeve. The energy absorbing sleeve has first and second cavities positioned diametrically opposed along the axis of force applied to the bushing, and has a connecting passageway interconnecting the cavities, these cavities containing a vibration damping fluid. The passageways serve as restrictive flow orifices to restrict the flow of the fluid between the cavities, and to thereby dampen the vibration of the outer sleeve with respect to the inner sleeve.

9 Claims, 10 Drawing Figures

VIBRATION DAMPING BUSHING

BACKGROUND OF THE INVENTION

1. Field of the Invention

The present invention relates to a bushing, and more particularly to the structure of the vibration damping bushing for use with a link type suspension system for a vehicle and an automotive vehicle drive axle vibration absorbing stabilizing system.

2. Description of the Prior Art

As is well known, a link type suspension system has a structure in which an axle housing is supported from the vehicle body by pairs of upper and lower links extending toward the axle housing on each side thereof. A pair of shock absorbers and suspension springs is disposed between each side of the axle housing and the vehicle body, thereby damping the vertical vibration of the axle housing with respect to the vehicle body.

The suspension system is expected to adequately damp a sudden change in the acceleration of the axle housing due to horizontal vibration and to be firm enough to impart no unnatural sensation.

The energy absorbing rubber sleeve of the bushing provided at one end of each link serves to protect the suspension system itself as well as satisfy the expectation mentioned above by absorbing small vibrations and sounds using deformation of the bushing rubber sleeve with the cooperation of other shock absorbers.

It is difficult, however, to set the resiliency of the rubber sleeve to a value which sufficiently satisfies the two opposing objectives of adequately smoothing a sudden change in the acceleration and being firm enough to impart to unnatural sensation. Accordingly, when drive torque is applied to the drive wheels and a wind-up of the axle housing produced by the drive reaction is transmitted through links to the bushings, the bushings are not expected to greatly damp the wind-up.

Thus, the prior art suspension system further includes an additional shock absorber to damp the moment occurring in the axle housing due to the wind-up.

However, the provision of the additional shock absorber requires relatively many auxiliary parts, such as fixing members and support members, which increases the amount of the assembling work and brings about a high manufacturing cost. A considerably wide space is additionally required between the axle housing and the vehicle body to prevent interference therebetween. Since the additional shock absorber does not operate in a one to one correspondence with the respective movements of the upper and lower links, its ability to damp vibrations is required to be enhanced by a relatively great amount, which may lead to an increase in the shock absorber friction and therefore passenger compartment noise and a harshness which is an impulsive vibration or sound produced when the vehicle runs over a joint or crack in the road.

Generally, in order to enhance the vibration damping characteristic, rubber material having a high loss factor, such as butyl rubber, can be used for the energy absorbing member which, however, increases its dynamic spring constant in high frequency vibrations and, as a result, passenger compartment noise and drive gear clashing increase, and its durability is impaired due to internal heat produced. This is undesirable from the standpoint of vehicle performance. Where the spring constant of the rubber sleeve in the axial direction of the link is decreased in terms of passenger compartment noise and harshness, the vehicle is susceptible to vibration due to axle housing yaw, which is further promoted due to the reduced loss factor of the rubber sleeve.

The present invention intends to eliminate the above drawbacks and problems.

SUMMARY OF THE INVENTION

The vibration damping bushing according to the present invention includes an energy absorbing sleeve positioned about an inner sleeve and within an outer sleeve. The energy absorbing sleeve has first and second cavities positioned diametrically opposed from each other along the axis of force applied to the bushing, and has a connecting passageway interconnecting the cavities. A vibration damping fluid is contained within the cavities. Thus, the passageway serves as a restrictive flow orifice to restrict the flow of the fluid between the cavities, and to thereby dampen the vibration of the outer sleeve with respect to the inner sleeve.

BRIEF DESCRIPTION OF THE DRAWINGS

These and other objects, features and advantages of the present invention will be clearly appreciated from the following description, taken in conjunction with the accompanying drawings, in which.

DETAILED DESCRIPTION OF THE PREFERRED AND ALTERNATIVE EMBODIMENTS

Figure 1:
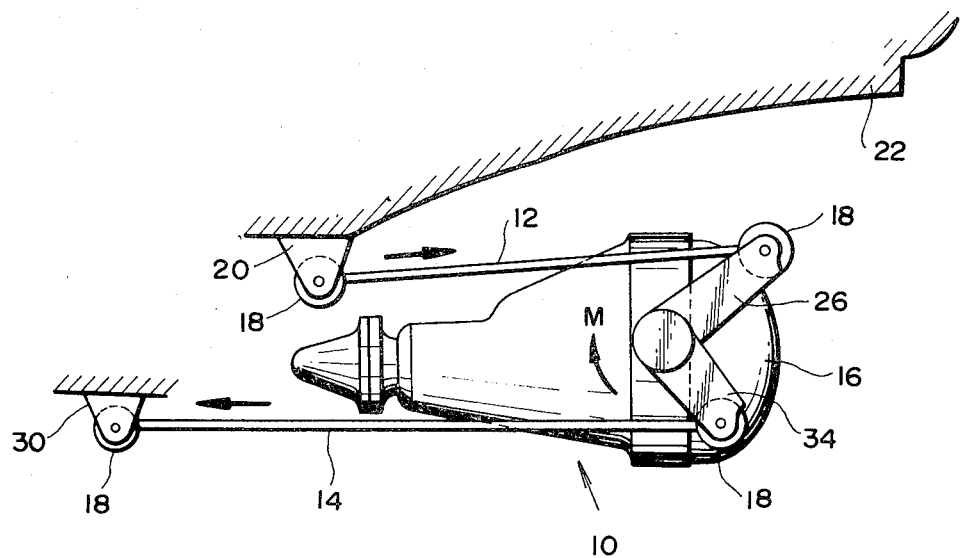
FIG. 1 is a diagrammatic side view of a suspension system using a bushing according to the present invention.

The same reference numeral designates corresponding elements or parts throughout the drawings.

Referring to FIG. 1, there is shown a link type suspension system for stabilizing the drive axle with respect to the vehicle body, which incorporates a vibration damping bushing 18 according to the present invention.

A pair of upper and lower links 12 and 14 is provided on each side of an axle housing 16. The upper link 12 is connected at one end to a vibration damping bushing 18 according to the present invention, pivotally supported by an upper support 20 secured to the vehicle body 22, and at the other end to a second bushing 18 pivoted on one end of an upper bracket 26 secured to the axle housing 16. The lower link 14 is connected at one end to a vibration damping bushing 18 pivotally supported by a lower support 30 and at the other end thereof to a second bushing 18 pivoted on one end of a lower bracket 34 whose other end is secured to the axle housing 16, the upper and lower brackets being secured substantially at right angles to each other. Conventional suspension springs and shock absorbers for vertically supporting the vehicle body are provided but not shown for the sake of brevity.

Figure 2A:
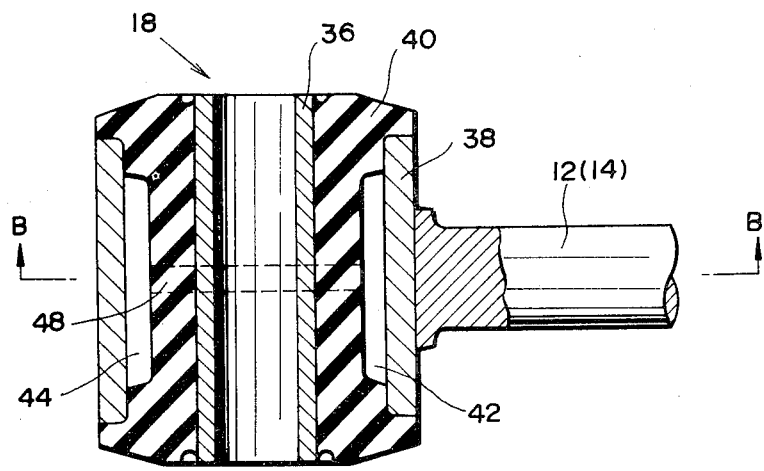
FIG. 2A is a plan view of the bushing.
Figure 2B:
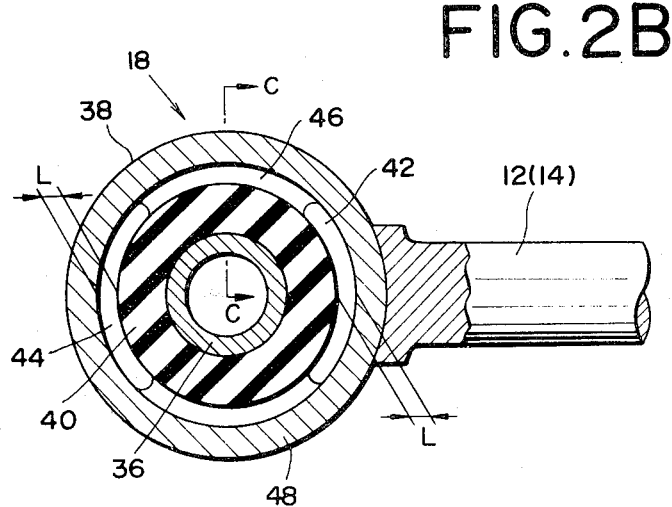
FIG. 2B is a cross-sectional view taken along the line B—B in FIG. 2A.
Figure 2C:
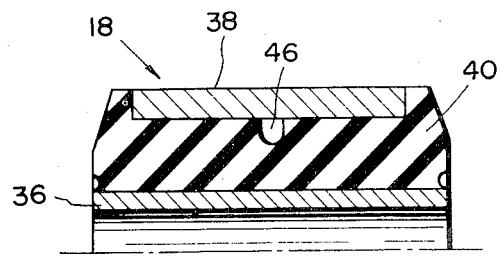
FIG. 2C is a cross-sectional view taken along the line C—C in FIG. 2B.

As shown in FIGS. 2A, 2B and 2C, the bushing 18 includes an inner cylindrical sleeve 36, an outer cylindrical sleeve 38 and an energy absorbing rubber sleeve 40 disposed coaxially between the inner and outer sleeves. The rubber sleeve 40 has a low loss factor. The bushing is provided with a pair of arcuate axially extending cavities 42, 44 having a depth L which cavities are diametrically opposed from each other on the outer surface of the rubber sleeve 40 and aligned with the axis of the link 12 or 14. The cavities 42, 44 are connected by a pair of diametrically opposed arcuate small passageways 46, 48. One of the passageways may be omitted. The cavities 42, 44 and the passageways 46, 48 contain a fluid such as grease. The configurations and dimensions of the passageways 46, 48 and the viscosity of the fluid used are determined according to the characteristic of the vehicle using the bushings 18. The passageways 46, 48 are restrictive flow orifices to regulate the flow of fluid between the cavities to permit the bushing to function as a shock absorber to absorb axial vibration of the respective links 12 and 14 transmitted to the outer sleeve 38.

In operation, when drive torque is applied to the drive wheels of the vehicle, the drive reaction causes a wind-up in the suspension system and the resulting wind-up moment M serves as an external force in a vibration system, which gives the following equation:

$$I.\ddot{\phi} + C_{\phi}\dot{\phi} + K_{100}.\phi = M_o \cos \omega t = M$$

where
I is the inertia moment of the suspension system,
$\phi$ is the wind-up rotation angle,
$K_\phi$ is the wind-up rigidity,
$C_{100}$ is the wind-up damping factor, and
$M_o$ is the moment due to the drive reaction.

Figure 3:
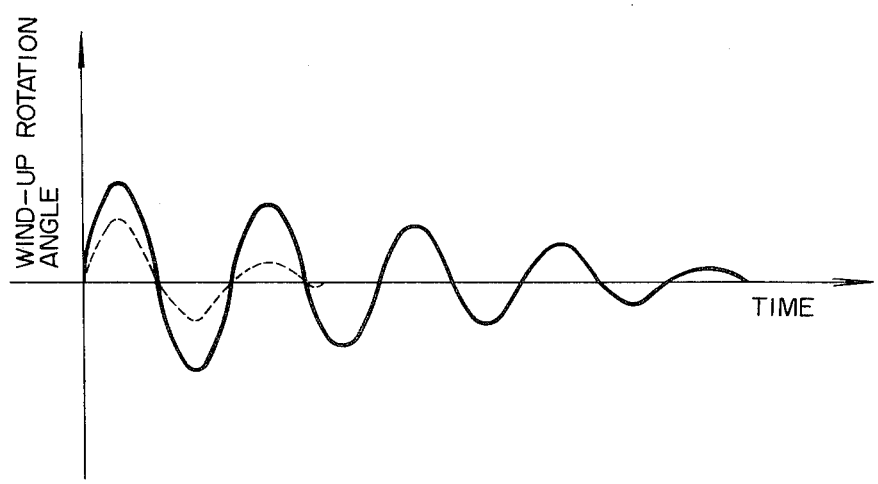
FIG. 3 shows the comparison in damping the wind-up between the suspension incorporating the bushing according to the present invention and a prior art suspension.

When the damping factor of the vibration system is small, the vibration normally continues for a relatively long time, as shown by the solid line in FIG. 3. However, the suspension system using the bushing according to the present invention has a relatively large vibration damping factor and therefore, the vibration occurring therein is damped in a relatively short time, as shown by the broken line in FIG. 3. That is, in the FIG. 1 system, when a load is axially applied to the links 12, 14, the fluid contained within the cavities 42, 44 and the passageways 46, 48 moves through the passageways between the cavities, and the passageways serve as restrictive flow orifices which regulate the flow of fluid between the cavities to permit the bushing to function as a shock absorber to dampen the vibration, and therefore prevent yawing which may occur about the axle housing 16. This restrains possible vehicle vibration, passenger compartment noise and harshness.

Figure 4:
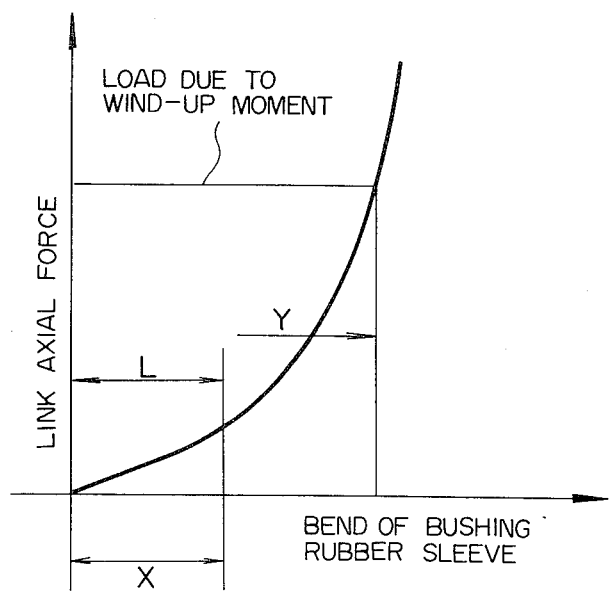
FIG. 4 is a graph showing the elastic characteristics of the bushing according to the present invention with a load applied to the bushing in the axial direction of a link.

In the ranges of passenger compartment noise and harshness where the link load is small, the bushings 18 maintain the ability to absorb vibrations by using their spring constant, small in the axial direction of the links, as shown by the range X in FIG. 4, and restrain displacement of the drive axle housing 16 with respect to the vehicle body 22 due to a large load which creates a wind-up, by using the non-linearity characteristic of the bushings, as shown by the range Y in FIG. 4.

Figure 5A:
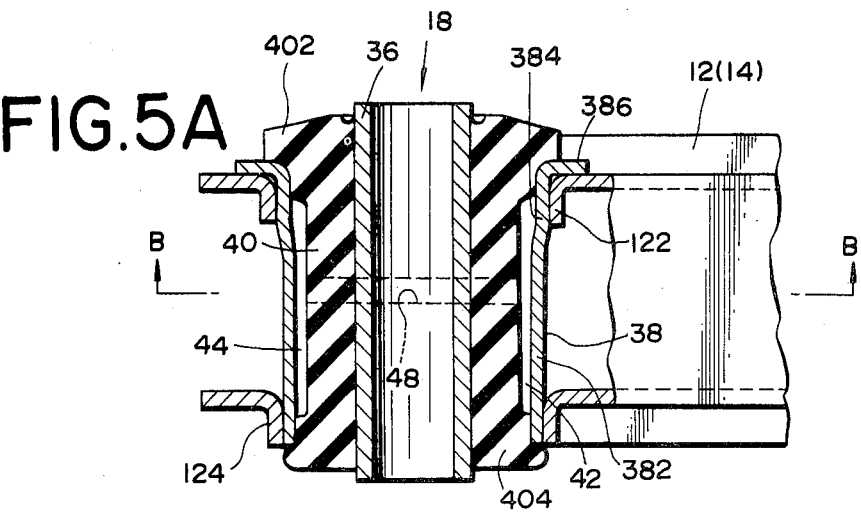
FIG. 5A is a plan view of a second embodiment of the bushing.
Figure 5B:
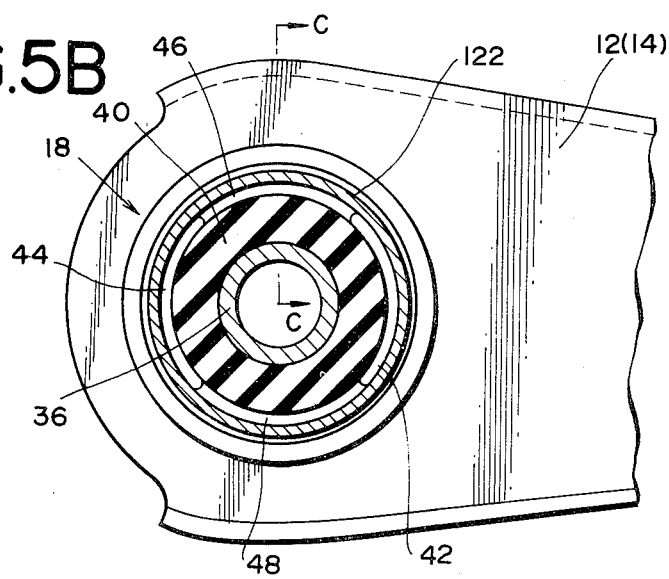
FIG. 5B is a sectional view taken along the line B—B in FIG. 5A.
Figure 5C:
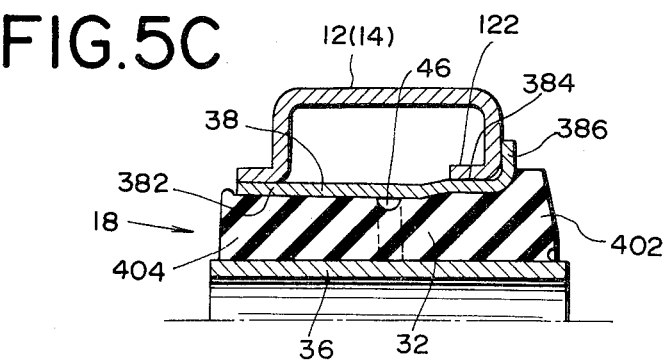
FIG. 5C is a cross-sectional view taken along the line C—C in FIG. 5B.

FIGS. 5A, 5B and 5C show a second embodiment of the bushing 18 which is pressed fitted in an end portion of either of the upper and lower links 12 and 14. The bushing 18 shown in FIGS. 5A, 5B and 5C is of the same structure as the bushing shown in FIGS. 2A, 2B and 2C, except that the outer sleeve 38 of the second embodiment bushing includes a smaller diameter longer portion 382 and a larger diameter shorter portion 384 with an end flange 386, and an energy absorbing rubber sleeve 40, which has a larger outer diameter end portion 402 and a smaller outer diameter end longer portion 404. The rubber sleeve with the inner cylindrical sleeve 36 therein is pressed into the outer sleeve 38, starting with inserting the end of the smaller outer diameter portion 404 into the opening of larger diameter portion 384 until part of the smaller outer diameter end portion 404 appears outside the other end of the outer sleeve 38 at which time part of the rubber sleeve larger outer diameter end portion 402 is compressed by the larger diameter portion 384 of the outer sleeve 38 while part of the rubber sleeve smaller outer diameter end portion 404 is compressed by the smaller diameter portion 382 of the outer sleeve 38. The resulting bushing assembly is then pressed into a pair of larger and smaller receiving rings 122 and 124 formed at one end of each of the upper and lower links 12 and 14 until the flange 386 of the outer sleeve 38 contacts the larger ring 122, starting with inserting the end of the smaller diameter portion 404 into the opening of the larger receiving ring 122. The larger and smaller portions 384 and 382 of the outer sleeve 38 are press fitted into the larger and smaller receiving rings 122 and 124. The order of the steps carried out for assembling and mounting the bushing to the link 12 or 14 may be reserved.

Figure 6:
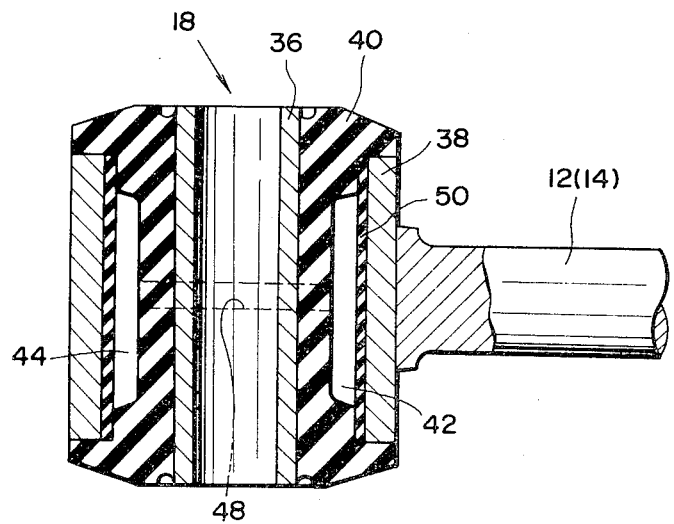
FIG. 6 is a plan cross-sectional view of a third embodiment of the bushing.

FIG. 6 shows a third embodiment of the bushing which is the same as the first embodiment, shown in FIGS. 2A, 2B and 2C, except that a fluid-tight rubber seal 50 is provided on the inner surface of the outer sleeve 38 to thereby fluid-seal the cavities 42, 44 and interconnecting passageways 46, 48 from the outer sleeve 38.

The vibration damping bushing of the present invention has been described as being utilized at each end of respective connecting links 12 and 14. Alaternatively, the vibration damping bushing may be utilized at either end of the connecting link, and a conventional bushing used at the other end, it of course being of paramount importance that at least one vibration absorbing bushing of the present invention be used in each link connecting the drive axle housing to the vehicle frame or body.

It will be understood by those skilled in the art that the foregoing description is made in terms of preferred and alternative embodiments of the present invention wherein various changes and modifications may be made without departing from the spirit and scope of the invention, which is to be defined by the appended claims.

What is claimed is:

1. A vibration damping bushing comprising:
  (a) an outer cylindrical sleeve;
  (b) an inner cylindrical sleeve;
  (c) an energy absorbing sleeve positioned about said inner sleeve and within said outer sleeve, said energy absorbing sleeve having first and second cavities positioned diametrically opposed from each other along the axis of force applied to said bushing, and having a connecting passageway interconnecting said cavities, and a vibration damping fluid contained within said cavities, whereby said passageway serves as a restrictive flow orifice to restrict the flow of the fluid between said cavities, to thereby dampen the vibration of said outer sleeve with respect to said inner sleeve; and (d) a fourth sleeve mounted within said outer sleeve to form a fluid-tight seal between said outer sleeve and said energy absorbing sleeve to thereby fluid-seal said cavities and interconnecting passageway from said outer sleeve.

2. The vibration damping bushing as set forth in claim 1, wherein said energy absorbing sleeve has two passageways diametrically opposed.

3. The vibration damping bushing as set forth in claim 2, wherein said outer sleeve is fixed to a force transmitting rod.

4. The vibration damping bushing as set forth in claim 2, wherein said outer sleeve is pressed into a force transmitting link.

5. An automotive vehicle drive axle vibration absorbing stabilizing system for stabilizing the drive axle with respect to the vehicle body, said system comprising:

(a) a first bracket connected to the axle;
(b) a second bracket connected to the axle;
(c) a first link connecting said first bracket to the vehicle body; and
(d) a second link connecting said second bracket to the vehicle body, wherein each of said links is formed with a vibration damping bushing, comprising:

(a) an outer cylindrical sleeve;
(b) an inner cylindrical sleeve; and
(c) an energy absorbing sleeve positioned about said inner sleeve and within said outer sleeve, said energy absorbing sleeve having first and second cavities positioned diametrically opposed from each other along the axis of said link, and having a connecting passageway interconnecting said cavities, and a vibration damping fluid contained within said cavities, whereby said passageway serves as a restrictive flow orifice to restrict the flow of fluid between said cavities, to thereby dampen the vibration of said link with respect to said inner sleeve; and (d) a fourth sleeve mounted within said outer sleeve to form a fluid-tight seal between said outer sleeve and said energy absorbing sleeve to thereby fluid-seal said cavities and interconnecting passageway from said outer sleeve.

6. The system as set forth in claim 5, wherein said energy absorbing sleeve has two passageways diametrically opposed.

7. The system as set forth in claim 5 or 6, wherein each of said first and second links is connected through said bushing to the vehicle body at the end of the link on the side of the vehicle body.

8. The system as set forth in claim 5 or 6, wherein each of said first and second links is connected through said bushing to a corresponding one of said first and second brackets at the end of the link on the side of the corresponding bracket.

9. The system as set forth in claim 5 or 6, wherein each of said first and second links is connected through a first said bushing to the vehicle body at the end of the link on the side of the vehicle body, and is connected through a second said bushing to a corresponding one of said first and second brackets at the end of the link on the side of the corresponding bracket.

* * * * *